(12) United States Patent
Saito et al.

(10) Patent No.: US 11,292,740 B2
(45) Date of Patent: Apr. 5, 2022

(54) OPTICAL FIBER MANUFACTURING METHOD AND OPTICAL FIBER MANUFACTURING APPARATUS

(71) Applicant: SUMITOMO ELECTRIC INDUSTRIES, LTD., Osaka (JP)

(72) Inventors: Takahiro Saito, Osaka (JP); Iwao Okazaki, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 64 days.

(21) Appl. No.: 15/931,983

(22) Filed: May 14, 2020

(65) Prior Publication Data

US 2020/0369554 A1    Nov. 26, 2020

(30) Foreign Application Priority Data

May 23, 2019   (JP) .............................. JP2019-097121

(51) Int. Cl.
   *C03B 37/025*   (2006.01)
   *C03C 25/106*   (2018.01)

(52) U.S. Cl.
   CPC ........ *C03B 37/0253* (2013.01); *C03C 25/106* (2013.01); *C03B 2205/50* (2013.01)

(58) Field of Classification Search
   CPC .................... C03C 25/106; C03B 37/0253
   See application file for complete search history.

(56) References Cited

U.S. PATENT DOCUMENTS

2007/0180862 A1*  8/2007  Takahashi ........... C03B 37/0146
                                                            65/484
2008/0107385 A1*  5/2008  Ohga ................ C03B 37/01228
                                                            385/123

FOREIGN PATENT DOCUMENTS

JP      H08-259254      10/1996

* cited by examiner

*Primary Examiner* — Cynthia Szewczyk
(74) *Attorney, Agent, or Firm* — IPUSA, PLLC (57) ABSTRACT

An optical fiber manufacturing method includes a process of passing a glass fiber through a fiber path before applying a resin. The glass fiber is drawn from a glass preform, the fiber path is formed through a cooling tube, and the cooling tube is housed in a casing and is cooled by a coolant. The process includes supplying a dry gas into a dry space formed between the casing and the cooling tube. The dry gas has a first dew point lower than the temperature of the cooling tube. The process includes measuring, by a dew point meter, a second dew point at one or both of an inlet and an outlet of the fiber path. The process includes controlling the temperature of the coolant in the cooling tube such that the temperature of the cooling tube is higher than the second dew point measured by the dew point meter.

3 Claims, 5 Drawing Sheets

OPTICAL FIBER MANUFACTURING METHOD AND OPTICAL FIBER MANUFACTURING APPARATUS

CROSS-REFERENCE TO RELATED APPLICATIONS

This application is based on and claims priority to Japanese Patent Application No. 2019-097121, filed on May 23, 2019, the entire contents of which are incorporated herein by reference.

BACKGROUND OF THE INVENTION

1. Field of the Invention

The disclosures herein generally relate to an optical fiber manufacturing method and an optical fiber manufacturing apparatus.

2. Description of the Related Art

An optical fiber manufacturing method includes a process of heating and melting a glass preform in a drawing furnace so as to draw the glass preform into a glass fiber. The above process is referred to as a "drawing" process. The temperature of the glass fiber immediately after drawing is high. Thus, a protective resin cannot be applied to the glass fiber as it is. For this reason, immediately after the glass fiber is drawn, the glass fiber is cooled by a cooling device before the resin is applied (see Patent Document 1, for example).

The cooling device described in Patent Document 1 includes a cooling tube cooled by a coolant, and a casing that houses the cooling tube. The glass fiber is cooled when passing through a fiber path that extends through the cooling tube in the vertical direction. A space between the casing and the cooling tube is maintained under a dry atmosphere having a dew point lower than the temperature of the cooling tube. Therefore, small water drops due to the condensation of water vapor can be prevented from adhering to the glass fiber (see paragraph 0014 of Patent Document 1).

In a typical drawing apparatus, a glass fiber is exposed to outside air between a drawing furnace and a cooling device. If a glass fiber path between the drawing furnace and the cooling device is shut off from outside air, and the glass fiber is not exposed to outside air, hot air would flow from the drawing furnace into the cooling device, causing the performance of cooling the glass fiber in the cooling device to be significantly decreased.

Conversely, if glass fiber is exposed to outside air, outside air would be carried along with the glass fiber into the casing when the glass fiber is drawn into the casing of the cooling device. As the drawing speed of the glass fiber increases, outside air is more readily carried into the casing.

Outside air is air containing water vapor, and the dew point of outside air is higher than the temperature of a cooling tube. In the related-art, the formation of frost or condensation may occur because a dew point measurement position within a casing is not appropriate, and thus, the amount of water vapor, exceeding an amount expected from the measured dew point, is carried into the fiber path.

RELATED-ART DOCUMENTS

Patent Documents

Patent Document 1: Japanese Laid-open Patent Publication No. 8-259254

SUMMARY OF THE INVENTION

According to an aspect of the present disclosure, a technology that reduces the formation of frost or water drops in a fiber path of a cooling tube is provided.

According to an aspect of the present disclosure, an optical fiber manufacturing method includes a passing process, passing a glass fiber through a fiber path before applying a resin. The glass fiber is drawn from a glass preform, the fiber path is formed through a cooling tube, and the cooling tube is housed in a casing and is cooled by a coolant. The passing process includes supplying a dry gas into a dry space formed between the casing and the cooling tube. The dry gas has a first dew point lower than the temperature of the cooling tube. The passing process includes measuring, by a dew point meter, a second dew point at one or both of an inlet and an outlet of the fiber path. The passing process includes controlling the temperature of the coolant in the cooling tube such that the temperature of the cooling tube is higher than the second dew point measured by the dew point meter.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

[Description of Embodiments of the Present Disclosure]

According to an aspect of the present disclosure, it is possible to reduce the formation of frost or water drops in a fiber path of a cooling tube.

First, embodiments of the present disclosure will be listed and described.

(1) According to an aspect of the present disclosure, an optical fiber manufacturing method includes a passing process, passing a glass fiber through a fiber path before applying a resin. The glass fiber is drawn from a glass preform, the fiber path is formed through a cooling tube, and the cooling tube is housed in a casing and is cooled by a coolant. The passing process includes supplying a dry gas into a dry space formed between the casing and the cooling tube. The dry gas has a first dew point lower than the temperature of the cooling tube. The passing process includes measuring, by a dew point meter, a second dew point at one or both of an inlet and an outlet of the fiber path. The passing process includes controlling the temperature of the coolant in the cooling tube such that the temperature of the cooling tube is higher than the second dew point measured by the dew point meter.

The inventors of the present invention investigated the cause of the breakage of a glass fiber, and found that the breakage of the glass fiber occurs when a dew point measurement position within a casing is not appropriate, and thus, the amount of water vapor, exceeding an amount expected from the measured dew point, is carried into a fiber path.

In the related-art, a dew point measurement position (such as a point 101P indicated by a white circle in FIG. 1) is located beside a cooling tube and is far away from a glass fiber. Therefore, the amount of water vapor, exceeding an amount expected from the measured dew point, may be carried into a fiber path. This is because outside air in the vicinity of the glass fiber is carried along with the glass fiber into the fiber path.

With the above-described optical fiber manufacturing method according to (1), the dew point is measured at one or both of the inlet and the outlet of the fiber path by the dew point meter. Therefore, the dew point of gas carried along with the glass fiber into the fiber path can be measured. In addition, the temperature of the coolant in the cooling tube is controlled such that the temperature of the cooling tube is higher than the dew point measured by the dew point meter, thereby reducing the formation of frost or condensation in the fiber path.

(2) According to another aspect of the present disclosure, an optical fiber manufacturing method includes a passing process, passing a glass fiber through a fiber path before applying a resin. The glass fiber is drawn from a glass preform, the fiber path is formed through a cooling tube, and the cooling tube is housed in a casing and is cooled by a coolant. The passing process includes supplying a dry gas into a dry space formed between the casing and the cooling tube. The dry gas has a first dew point lower than the temperature of the cooling tube. The passing process includes measuring, by a dew point meter, a second dew point at one or both of an inlet and an outlet of the fiber path. The passing process includes controlling a flow rate of the dry gas such that the second dew point measured by the dew point meter is lower than the temperature of the cooling tube.

With the above-described optical fiber manufacturing method according to (2), the dew point is measured at one or both of the inlet and the outlet of the fiber path by the dew point meter. Therefore, the dew point of gas carried along with the glass fiber into the fiber path can be measured. In addition, the flow rate of the dry gas is controlled such that the dew point measured by the dew point meter is lower than the temperature of the cooling tube, thereby reducing the formation of frost or condensation in the fiber path.

(3) According to yet another aspect of the present disclosure, an optical fiber manufacturing method includes a passing process, passing a glass fiber through a fiber path before applying a resin. The glass fiber is drawn from a glass preform, the fiber path is formed through a cooling tube, and the cooling tube is housed in a casing and is cooled by a coolant. The passing process includes supplying a dry gas into a dry space formed between the casing and the cooling tube. The dry gas has a first dew point lower than the temperature of the cooling tube. The passing process includes measuring, by a dew point meter, a second dew point at one or both of an inlet and an outlet of the fiber path. The passing process includes controlling the first dew point of the dry gas supplied into the casing such that the second dew point measured by the dew point meter is lower than the temperature of the cooling tube.

With the above-described optical fiber manufacturing method according to (3), the dew point is measured at one or both of the inlet and the outlet of the fiber path by the dew point meter. Therefore, the dew point of gas carried along with the glass fiber into the fiber path can be measured. In addition, the dew point of the dry gas is controlled such that the dew point measured by the dew point meter is lower than the temperature of the cooling tube, thereby reducing the formation of frost or condensation in the fiber path.

(4) According to an aspect of the present disclosure, an optical fiber manufacturing apparatus includes a drawing furnace, a cooling device, a coolant supply device, a dry gas supply device, a dew point meter, a controller, and an applying device. The drawing furnace is configured to heat and melt a glass preform so as to draw a glass fiber from the glass preform. The cooling device includes a cooling tube cooled by a coolant, a fiber path formed through the cooling tube and through which the glass fiber passes, and a casing that houses the cooling tube. The coolant supply device includes a temperature controller configured to control the temperature of the coolant, and also includes a pump configured to supply the coolant from the temperature controller to the cooling tube. The dry gas supply device is configured to supply a dry gas into a dry space formed between the casing and the cooling tube. The dry gas has a first dew point lower than the temperature of the cooling tube. The dew point meter is configured to measure a second dew point at one or both of an inlet and an outlet of the fiber path. The controller is configured to control the temperature controller such that the temperature of the cooling tube is higher than the second dew point measured by the dew point meter. The applying device is configured to apply a resin to the glass fiber cooled by the cooling device.

With the above-described optical fiber manufacturing apparatus according to (4), an effect similar to that of the optical fiber manufacturing method according to (1) can be obtained.

(5) According to another aspect of the present disclosure, an optical fiber manufacturing apparatus includes a drawing furnace, a cooling device, a coolant supply device, a dry gas supply device, a dew point meter, a controller, and an applying device. The drawing furnace is configured to heat and melt a glass preform so as to draw a glass fiber from the glass preform. The cooling device includes a cooling tube cooled by a coolant, a fiber path formed through the cooling tube and through which the glass fiber passes, and a casing that houses the cooling tube. The coolant supply device includes a temperature controller configured to control the temperature of the coolant, and also includes a pump configured to supply the coolant from the temperature controller to the cooling tube. The dry gas supply device is configured to supply a dry gas into a dry space formed between the casing and the cooling tube. The dry gas has a first dew point lower than the temperature of the cooling tube. The dew point meter is configured to measure a second dew point at one or both of an inlet and an outlet of the fiber path. The controller is configured to control the dry gas supply device such that the second dew point measured by the dew point meter is lower than the temperature of the cooling tube. The applying device is configured to apply a resin to the glass fiber cooled by the cooling device.

With the above-described optical fiber manufacturing apparatus according to (5), an effect similar to one or both of the effect of the optical fiber manufacturing method according to (2) and the effect of the optical fiber manufacturing method according to (3) can be obtained.

[Details of Embodiments of Present Disclosure]

In the following, embodiments of the present disclosure will be described. In the following description, the same or corresponding elements are denoted by the same reference numerals, and a description thereof may be omitted. [Optical Fiber Manufacturing Apparatus]

Figure 1:
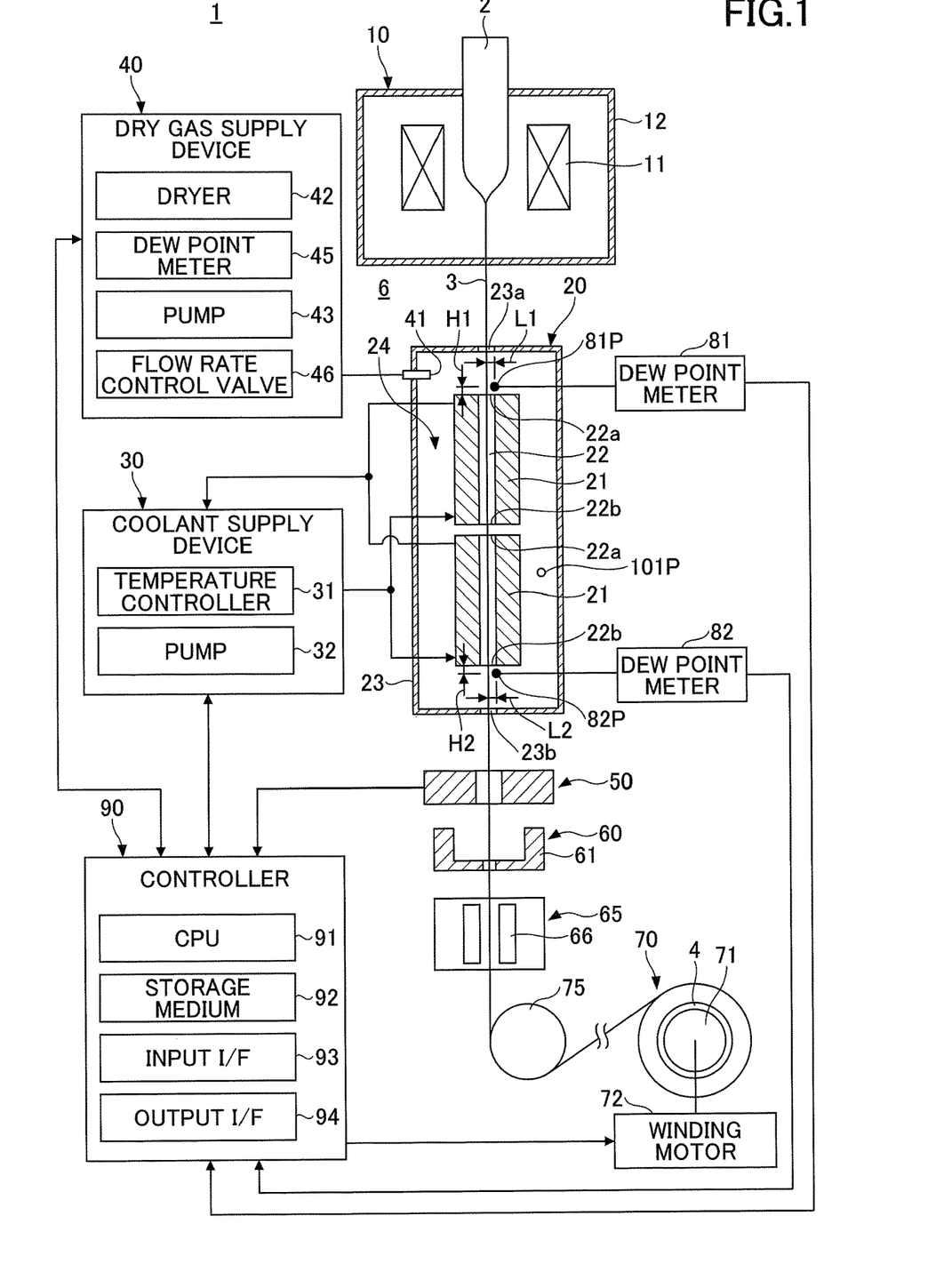
FIG. 1 is a diagram illustrating an optical fiber manufacturing apparatus according to an embodiment.

FIG. 1 is a diagram illustrating an optical fiber manufacturing apparatus according to an embodiment. An optical fiber manufacturing apparatus 1 includes a drawing furnace 10, a cooling device 20, a coolant supply device 30, a dry gas supply device 40, an outer diameter measuring instrument 50, a resin applying device 60, a resin curing device 65, a winding device 70, an inlet dew point meter 81, an outlet dew point meter 82, and a controller 90. As will be described later, the optical fiber manufacturing apparatus 1 may include one or both of the inlet dew point meter 81 and the outlet dew point meter 82.

The drawing furnace 10 heats and melts a glass preform 2 so as to draw a glass fiber 3 from the glass preform 2. The glass preform 2 is formed in a bar shape beforehand, and has a refractive index distribution in the radial direction. The glass preform 2 is suspended such that the longitudinal direction of the glass preform 2 is the vertical direction.

The glass fiber 3 is drawn linearly from the lower end of the glass preform 2, and is suspended. Similar to the glass preform 2, the glass fiber 3 has a refractive index distribution in the radial direction. The glass fiber 3 include a core and a cladding that surrounds the outer periphery of the core. The refractive index of the core is larger than the refractive index of the cladding.

The drawing furnace 10 includes a heat source 11 that heats and melts the glass preform 2, and a furnace body 12 that houses the heat source 11. The heat source 11 may be an electric heater. Note that the heat source 11 may be configured by a coil and a conductor. When a current is applied to the coil by a high-frequency power source, the coil forms a magnetic field around the conductor, and an eddy current flows in the conductor, thereby causing the conductor to generate heat.

The furnace body 12 has an inlet at the upper end of the furnace body 12. The glass preform 2 is inserted from the inlet of the furnace body 12 into the inside of the furnace body 12. Further, the furnace body 12 has an outlet at the lower end of the furnace body 12. The glass fiber 3 is led out to the outside of the furnace body 12 from the outlet of the furnace body 12. An inert gas such as helium or argon is supplied into the furnace body 12.

Because the temperature of the glass fiber 3 immediately after drawing is high, a protective resin cannot be applied to the glass fiber 3 as it is. For this reason, immediately after the glass fiber 3 is drawn, the glass fiber 3 is cooled by the cooling device 20 before the resin is applied. The cooling device 20 is disposed vertically below the drawing furnace 10.

The cooling device 20 includes cooling tubes 21 cooled by a coolant, and a fiber path 22 formed through each of the cooling tubes 21. The fiber path 22 extends through each of the cooling tubes 21 in the vertical direction. An inlet 22a of the fiber path 22 is formed on the upper surface of each of the cooling tubes 21. An outlet 22b of the fiber path 22 is formed on the lower surface of each of the cooling tubes 21. The fiber path 22 is a path through which the glass fiber 3 passes. The glass fiber 3 travels from the inlet 22a of the fiber path 22 toward the outlet 22b of the fiber path 22.

The plurality of cooling tubes 21 are arranged in a line in the vertical direction. By arranging the plurality of short cooling tubes 21, manufacturing costs can be reduced. Manufacturing costs can be reduced by separately manufacturing short members and connecting the members together, rather than manufacturing a single long member. In addition, the temperature may be changed for each of the cooling tubes 21. The temperature(s) of the cooling tubes 21 are the approximately same as the temperature of the coolant.

The cooling device 20 includes a casing 23 that houses the cooling tubes 21. A dry space 24 is defined by the casing 23 and the cooling tubes 21. The dry space 24 is formed inside the casing 23 and also outside the cooling tubes 21. A dry gas having a dew point lower than the temperature(s) of the cooling tubes 21 is supplied into the dry space 24.

The dew point is the temperature at which water vapor starts to condensate into water when a gas containing water vapor is cooled. When the dew point is below 0° C., water vapor starts to condensate into water and the water starts to freeze into ice when a gas containing water vapor is cooled to the dew point.

In the present embodiment, the dew point is measured at the same air pressure as air pressure P1 in the dry space 24. This is because the present disclosure is intended to reduce the formation of frost or condensation in the dry space 24. The air pressure P1 in the dry space 24 is higher than air pressure P0 in an external space 6, as will be described later.

The external space 6 is a space outside the casing 23. Typically, the external space 6 is filled with air. The air pressure P0 in the external space 6 is atmospheric pressure.

The differential pressure $\Delta P1$ between the air pressure P1 in the dry space 24 and the air pressure P0 in the external space 6 ($\Delta P1 = P1 - P0$) is typically 1% or less of the air pressure P0 in the external space 6. Therefore, the dew point may be measured at the air pressure P0 in the external space 6, namely at atmospheric pressure. If the differential pressure $\Delta P1$ is 1% or less of atmospheric pressure, the difference in dew point caused by the differential pressure $\Delta P1$ is negligibly small.

As described above, the plurality of cooling tubes 21 are arranged in a line in the vertical direction. There may be a case where the plurality of cooling tubes 21 are controlled at different temperatures. For example, a cooling tube 21 located at the lower side may be controlled at a temperature lower than that of a cooling tube 21 located at the upper side. If the plurality of cooling tubes 21 are controlled at different temperatures, the dry gas having a dew point lower than the lowest temperature of a cooling tube 21 is supplied into the dry space 24.

The casing 23 maintains the dry gas in the surroundings of the cooling tubes 21. In the present embodiment, dry air is used as the dry gas; however, nitrogen gas may be used. The dew point of the dry gas is lower than the temperature(s) of the cooling tubes 21. Accordingly, even if the dry gas is cooled, it is possible to prevent the formation of frost or condensation on the cooling tubes 21, and thus possible to prevent the breakage of the glass fiber 3 due to such frost or condensation. Note that frost occurs when the temperature(s) of the cooling tubes 21 are 0° C. or below, and condensation occurs when the temperature(s) of the cooling tubes 21 are above 0° C.

As described above, the air pressure P1 in the dry space 24 is slightly higher than the air pressure P0 in the external space 6. The differential pressure $\Delta P1$ enables the restriction of the flow of outside air from the external space 6 into the dry space 24. By restricting the flow of outside air from the external space 6 into the dry space 24, it is possible to reduce the flow of water vapor from the external space 6 into the dry space 24, thereby reducing the formation of frost or condensation on the cooling tubes 21.

The casing 23 includes an inlet 23a at the upper end of the casing 23. The glass fiber 3 is led from the inlet 23a of the casing 23 into the inside of the casing 23. In addition, the casing 23 includes an outlet 23b at the lower end of the casing 23. The glass fiber 3 is led out to the outside of the casing 23 from the outlet 23b of the casing 23.

The glass fiber 3 is led from the inlet 23a of the casing 23 toward the outlet 23b of the outlet 23b, and passes through the fiber path 22 of each of the cooling tubes 21 on the way. The temperature of the glass fiber 3 at the inlet 23a of the casing 23 is, for example, approximately 1200° C. The temperature of the glass fiber 3 at the outlet 23b of the casing 23 is, for example, approximately 50° C.

The glass fiber 3 is cooled by 1000° C. or more between the inlet 23a of the casing 23 and the outlet 23b of the casing 23. At least some of the cooling tubes 21 are cooled by the coolant at a temperature lower than 0° C. such that the glass fiber 3 is rapidly cooled.

Figure 2:
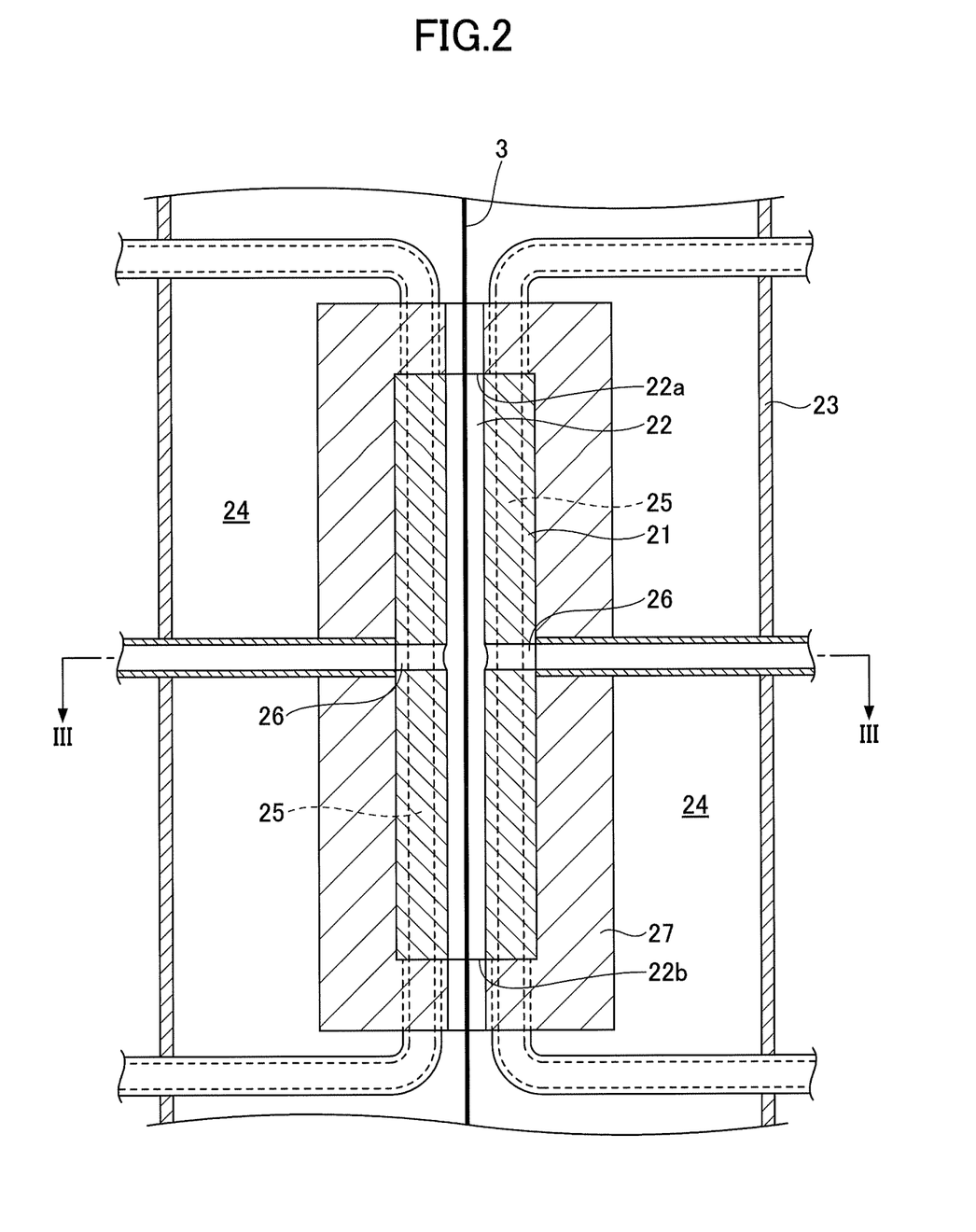
FIG. 2 is a cross-sectional view of a cooling tube and a casing according to an embodiment.
Figure 3:
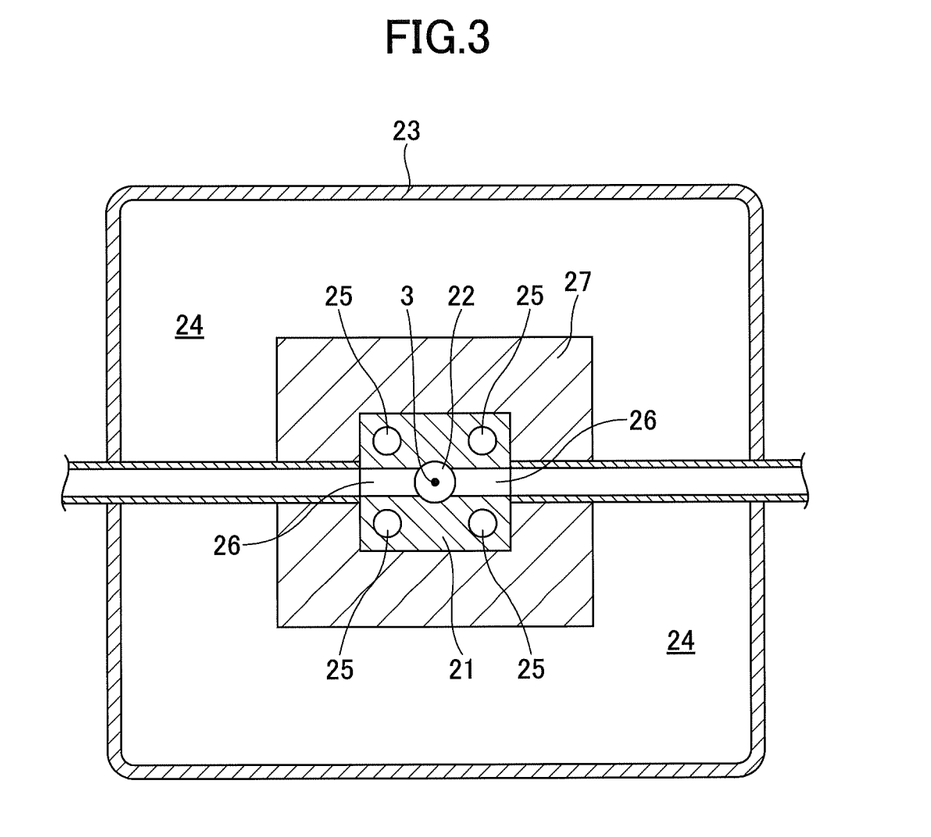
FIG. 3 is a cross-sectional view of the cooling tube and the casing taken through of FIG. 2.

FIG. 2 is a cross-sectional view of a cooling tube and a casing according to an embodiment. FIG. 3 is a cross-sectional view of the cooling tube and the casing taken through of FIG. 2.

The cooling device 20 includes coolant passages 25 formed in a cooling tube 21. Portions of the coolant passages 25 are formed along a fiber path 22. As illustrated in FIG. 3, the four coolant passages 25 may be formed in the surroundings of the fiber path 22. Note that the number of coolant passages 25 is not particularly limited.

The cooling device 20 includes heat transfer gas supply paths 26 formed in the cooling tube 21. The heat transfer gas supply paths 26 supply a heat transfer gas into the fiber path 22. The heat transfer gas promotes cooling of the glass fiber 3 by transferring heat from the high-temperature glass fiber 3 to the low-temperature cooling tube 21. Examples of the heat transfer gas used include He gas.

The dew point of the heat transfer gas is lower than the temperature of the cooling tube 21. For example, the heat transfer gas may be supplied into the fiber path 22 via the heat transfer gas supply paths 26 after passing through a gas tube cooled by liquid nitrogen. In this case, the dew point of the heat transfer gas is approximately the same as the boiling point of liquid nitrogen (−196° C.).

The heat transfer gas supply paths 26 are horizontally disposed. As illustrated in FIG. 3, the pair of heat transfer gas supply paths 26 are disposed, with the fiber path 22 being interposed therebetween. Note that the heat transfer gas supply paths 26 may be radially disposed around the fiber path 22 when viewed from the vertical direction.

The heat transfer gas is supplied from the center in the vertical direction of the fiber path 22 into the fiber path 22. The flow of heat transfer gas branches into an upward flow and a downward flow at the center in the vertical direction of the fiber path 22.

The heat transfer gas passes through the inlet 22a of the fiber path 22 and the outlet 22b of the fiber path 22, and is discharged into the dry space 24 formed between the casing 23 and the cooling tube 21. Then, the heat transfer gas is discharged to the outside of the casing 23. Note that the heat transfer gas may be recovered and reused. The pressure of the fiber path 22 is approximately the same as the air pressure in the dry space 24, or is slightly higher than the air pressure in the dry space 24.

In addition to the cooling tube 21 and the casing 23, the cooling device 20 includes a heat insulator 27. The heat insulator 27 increases cooling efficiency by restricting heat transfer from the dry gas, which has been supplied into the casing 23, to the cooling tube 21. The heat insulator 27 covers the surface of the cooling tube 21, except for portions facing the fiber path 22. The heat insulator 27 is disposed so as not to interfere with the glass fiber 3.

As illustrated in FIG. 1, the coolant supply device 30 includes a temperature controller 31 and a pump 32. The temperature controller 31 controls the temperature of the coolant, and the pump 32 supplies the coolant from the temperature controller 31 to the cooling tube 21. Examples of the coolant include a coolant that is in a liquid phase at a temperature ranging from at least −70° C. or more to room temperature (for example, 20° C.) or less. Specific examples of the coolant include perfluoropolyether.

The coolant is cooled to a set temperature by the temperature controller 31, and is then supplied to the cooling tube 21 by the pump 32. The coolant is returned to the coolant supply device 30 after absorbing heat transferred from the high-temperature glass fiber 3 to the low-temperature cooling tube 21. Then, the coolant is cooled to the set temperature again by the temperature controller 31, and is supplied to the cooling tube 21 by the pump 32.

The dry gas supply device 40 supplies the dry gas, having a dew point lower than the temperature of the cooling tube 21, into the dry space 24 formed between the casing 23 and the cooling tube 21. A dry gas inlet 41 is disposed facing the dry space 24 and near the inlet 23a of the casing 23. By supplying the dry gas, it is possible to restrict the flow of outside air into the casing 23.

The dry gas supply device 40 includes a dryer 42 and a pump 43. The dryer 42 generates the dry gas by reducing water vapor contained in a source gas of the dry gas. The pump 43 supplies the dry gas from the dryer 42 into the casing 23. Examples of the source gas of the dry gas include air. In this case, dry air is generated as the dry gas. The content of water vapor is reduced by, for example, the adsorption of water vapor.

The dry gas supply device 40 includes a dew point meter 45 that measures the dew point of the dry gas generated by the dryer 42. The dew point meter 45 is installed at the dryer 42. The dry gas is dried to a preset dew point by the dryer 42, and then supplied from the dryer 42 into the casing 23 by the pump 43.

The dry gas supply device 40 includes a flow rate control valve 46 that controls the flow rate of the dry gas supplied into the casing 23. After the dry gas is supplied into the casing 23, the dry gas passes through the outlet 23b of the casing 23, and is discharged to the outside of the casing 23.

The outer diameter measuring instrument 50 measures the outer diameter of the glass fiber 3 cooled by the cooling device 20. The outer diameter of the glass fiber 3 refers to the outer diameter of the cladding. For example, the outer diameter measuring instrument 50 measures the outer diameter of the glass fiber 3 by irradiating the glass fiber 3 with a light flux and capturing an image of the light flux that has passed through the glass fiber 3. The drawing speed of the glass fiber 3 is controlled, such that a measured value of the outer diameter measuring instrument 50 is a set value (125 μm, for example).

The resin applying device 60 applies a resin to the glass fiber 3. The resin applying device 60 includes a die 61 with which a liquid resin is stored and applied. When the glass fiber 3 passes through the die 61, the resin is applied to the outer peripheral surface of the glass fiber 3. Examples of the resin include an ultraviolet curing resin cured by ultraviolet light.

The resin curing device 65 cures the resin applied to the outer peripheral surface of the glass fiber 3. For example, when an ultraviolet curing resin is cured, the resin curing device 65 includes an ultraviolet lamp 66 that irradiates ultraviolet light. When the glass fiber 3 passes beside the ultraviolet lamp 66, the resin applied to the outer peripheral surface of the glass fiber 3 is cured.

Note that a thermosetting resin may be used instead of the ultraviolet curing resin. A plurality of resins may be overlaid on the outer peripheral surface of the glass fiber 3. That is, a plurality of resin layers may be laminated on the outer peripheral surface of the glass fiber 3.

The winding device 70 includes a winding bobbin holder 71 and a winding motor 72. The winding bobbin holder 71 removably holds a winding bobbin 4 on which the glass fiber 3 is wound, and the winding motor 72 rotates the winding bobbin holder 71. After the glass fiber 3 passes through the resin curing device 65, the glass fiber 3 is redirected by the guide roller 75, and is finally wound by the winding bobbin 4. Note that, after the glass fiber 3 is drawn from the glass preform 2, the glass fiber 3 travels downward in the vertical direction until the glass fiber 3 is redirected by the guide roller 75.

The glass fiber 3 is exposed to outside air between the drawing furnace 10 and the cooling device 20. If a path of the glass fiber 3 from the drawing furnace 10 to the cooling device 20 is shut off from outside air, and the glass fiber 3 is not exposed to outside air, hot air would flow from the drawing furnace 10 into the cooling device 20. As a result, the performance of cooling the glass fiber 3 in the cooling device 20 would be significantly decreased.

When the glass fiber 3 is led into the casing 23 of the cooling device 20, outside air may be carried along with the glass fiber 3 into the casing 23. As the drawing speed of the glass fiber 3 increases, outside air is more readily carried into the casing 23.

In particular, when the drawing speed of the glass fiber 3 is 1000 m/min or more, outside air is readily carried into the casing 23. The drawing speed of the glass fiber 3 is 600 m/min to 2500 m/min, for example.

Outside air is air that contains water vapor. The dew point of outside air is higher than the temperature of the cooling tube 21. Therefore, when outside air is carried along with the glass fiber 3 into the fiber path 22 of the cooling tube 21, water vapor is carried into the fiber path 22.

The inventors of the present invention investigated the cause of the breakage of a glass fiber, and found that the breakage of the glass fiber occurs because a dew point measurement position within a casing is not appropriate, and thus, the amount of water vapor, exceeding an amount expected from the measured dew point, is carried into a fiber path.

In the related-art, a dew point measurement position (such as a point 101P indicated by a white circle in FIG. 1) in a casing is located beside a cooling tube and is far away from a glass fiber. Therefore, in the related-art, the amount of water vapor, exceeding an amount expected from the measured dew point, may be carried into a fiber path. This is because outside air in the vicinity of the glass fiber is carried along with the glass fiber into the fiber path.

According to the embodiments of the present invention, the dew point is measured at an inlet 22a and an outlet 22b of fiber paths 22. As will be described later, the dew point may be measured at one or both of the inlet 22a and the outlet 22b. In both cases, the dew point of gas carried along with the glass fiber 3 into the fiber paths 22 can be measured. In addition, the temperature of the coolant in the cooling tubes 21 is controlled such that the temperature of the cooling tubes 21 is higher than the dew point measured by at least one of the dew point meters, thereby reducing the formation of frost or condensation in the fiber paths 22.

The dew point meter 81 measures the dew point at an inlet 22a of a fiber path 22. The dew point meter 81 that measures the dew point at the inlet 22a is hereinafter also referred to as the inlet dew point meter 81. A measurement point 81P of the inlet dew point meter 81 is disposed near the inlet 22a of the fiber path 22 so as not to interfere with the glass fiber 3 while also allowing the dew point of gas carried along with the glass fiber 3 to be measured.

The measurement point 81P of the inlet dew point meter 81 is located below the inlet 23a of the casing 23, and also located above the uppermost cooling tube 21, which is the nearest to the inlet 23a of the casing 23. The vertical distance H1 between the measurement point 81P of the inlet dew point meter 81 and the uppermost cooling tube 21 may be 1 mm or more and 500 mm or less. Further, the horizontal distance L1 between the measurement point 81P of the inlet dew point meter 81 and the centerline of the glass fiber 3 may be 1 mm or more and 500 mm or less.

The dew point meter 82 measures the dew point at an outlet 22b of a fiber path 22. The dew point meter 82 that measures the dew point at the outlet 22b is hereinafter also referred to as the outlet dew point meter 82. A measurement point 82P of the outlet dew point meter 82 is disposed near the outlet 22b of the fiber path 22 so as not to interfere with the glass fiber 3 while also allowing the dew point of gas carried along with the glass fiber 3 to be measured.

The measurement point 82P of the outlet dew point meter 82 is located above the outlet 23b of the casing 23, and also located below the lowermost cooling tube 21, which is the nearest to the outlet 23b of the casing 23. The vertical distance H2 between the measurement point 82P of the outlet dew point meter 82 and the lowermost cooling tube 21 may be 1 mm or more and 500 mm or less. Further, the horizontal distance L2 between the measurement point 82P of the outlet dew point meter 82 and the centerline of the glass fiber 3 may be 1 mm or more and 500 mm or less.

In the present embodiment, the optical fiber manufacturing apparatus 1 may include both the inlet dew point meter 81 and the outlet dew point meter 82, or may include one of the inlet dew point meter 81 and the outlet dew point meter 82. In both cases, it is possible to reduce the formation of frost or condensation in the fiber paths 22 by controlling the temperature of the coolant in the cooling tubes 21 such that the temperature of the cooling tubes 21 is higher than the dew point measured by at least one of the dew point meters.

The controller 90 is configured by a computer, for example. As illustrated in FIG. 1, the controller 90 includes a central processing unit (CPU) 91, a storage medium 92 such as a memory, an input interface 93, and an output interface 94. The controller 90 controls the operation of the optical fiber manufacturing apparatus 1 by causing the CPU 91 to execute a program stored in the storage medium 92. Further, the controller 90 receives signals from external devices via the input interface 93 and transmits signals to external devices via the output interface 94.

Figure 4:
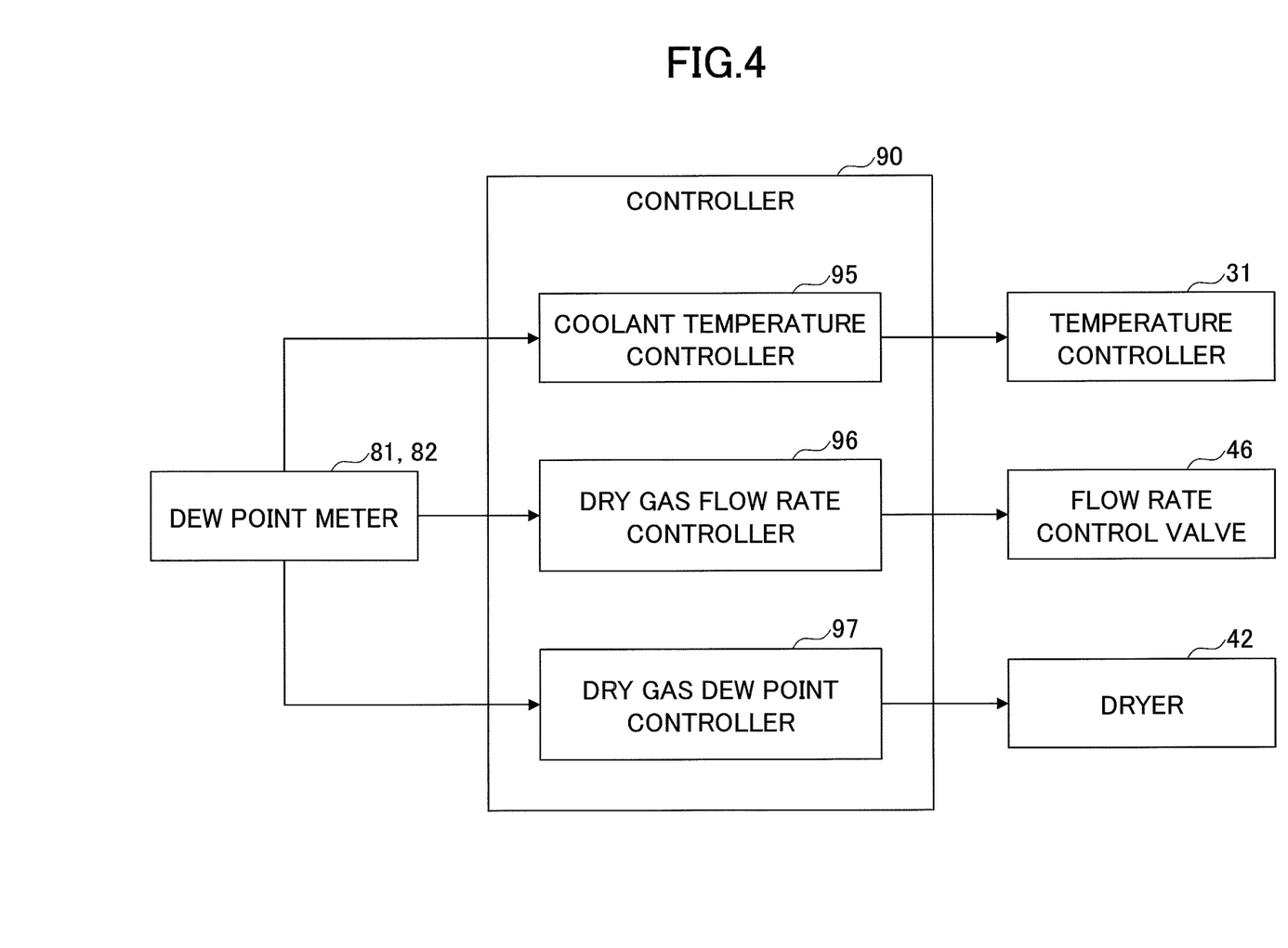
FIG. 4 is a block diagram illustrating functional blocks of a controller according to an embodiment.

FIG. 4 is a block diagram illustrating functional blocks of the controller according to an embodiment. Note that FIG. 4 illustrates the concept of the functional blocks, and the functional blocks are not required to be physically configured as illustrated in FIG. 4. All or some of the functional blocks may be functionally or physically separated or combined in any unit. Further, some or all functions of the functional blocks may be performed by a program executed by the CPU, or may be implemented as hardware using wired logic.

As illustrated in FIG. 4, the controller 90 includes a coolant temperature controller 95, a dry gas flow rate controller 96, and a dry gas dew point controller 97. The coolant temperature controller 95 controls the operation of the temperature controller 31 such that the temperature of the coolant is a set value. The dry gas flow rate controller 96 controls the operation of the flow rate control valve 46 such that the flow rate of the dry gas is a set value. The dry gas dew point controller 97 controls the operation of the dryer 42 such that the dew point of the dry gas is a set value.

When the inlet dew point meter 81 is included, the coolant temperature controller 95 controls the temperature of the coolant in the cooling tubes 21 such that the temperature of the cooling tubes 21 is higher than the dew point measured by the inlet dew point meter 81. The temperature, of the cooling tubes 21, that is compared to the dew point measured by the inlet dew point meter 81, is the lowest temperature of the cooling tubes 21. The lowest temperature of the cooling tubes 21 is approximately equal to the temperature of the coolant in the cooling tubes 21.

Outside air is carried along with the glass fiber 3 from an inlet 22a into the fiber paths 22. Outside air may be sometimes carried into the fiber paths 22 from an outlet 22b. However, the amount of outside air carried into the fiber paths 22 from the outlet 22b is smaller than the amount of outside air carried into the fiber path 22 from the inlet 22a. The heat transfer gas, having the dew point that is lower than that of outside air, is supplied into the fiber paths 22. Therefore, outside air flowing into the fiber paths 22 is diluted with the heat transfer gas.

The proportion of the heat transfer gas in the atmosphere in the vicinity of the inlet 22a is smaller than the proportion of the heat transfer gas in the atmosphere in the vicinity of the outlet 22b. In addition, the proportion of outside air in the atmosphere in the vicinity of the inlet 22a is larger than the proportion of outside air in the atmosphere in the vicinity of the outlet 22b. Accordingly, the dew point at the inlet 22a is typically higher than the dew point at the outlet 22b. Therefore, when the temperature of the coolant is controlled based on the dew point at the inlet 22a, the formation of frost or condensation in the fiber paths 22 can be securely reduced because the temperature of the coolant can be controlled based on the higher dew point.

Further, when the temperature of the coolant is controlled based on the dew point at the inlet 22a, variations in the actual amount of outside air carried into the fiber path 22 can be readily addressed. This is because outside air is carried into the fiber path 22 mainly from the inlet 22a. The amount of outside air carried into the fiber path 22 varies also depending on the drawing speed of the glass fiber 3.

The coolant temperature controller 95 may control the temperature of the coolant in the cooling tubes 21, such that the temperature of the cooling tubes 21 is higher than the dew point measured by the outlet dew point meter 82. However, as described above, the dew point T1 at the inlet 22a is typically higher than the dew point T2 at the outlet 22b. Given the difference α (α=T1−T2), the coolant temperature controller 95 needs to control the temperature of the coolant in the cooling tubes 21, such that the temperature of the cooling tubes 21 is higher than T2+α. Note that outside air may be carried into the fiber paths 22 from the outlet 22b. Therefore, the formation of frost or condensation in the fiber paths 22 can be more securely reduced by measuring the dew point both at the outlet 22b and the inlet 22a, such that the temperature of the coolant in the cooling tubes 21 is higher than the dew point measured both at the outlet 22b and the inlet 22a.

The dry gas flow rate controller 96 may control the flow rate of the dry gas supplied into the casing 23, such that the dew point measured by the inlet dew point meter 81 is lower than the temperature of the cooling tube 21. As the flow rate of the dry gas increases, outside air is readily diluted with the dry gas, and the dew point at the inlet 22a decreases. If it is difficult to increase the temperature of the cooling tubes 21, the formation of frost or condensation can be reduced by increasing the flow rate of the dry gas, and thus decreasing the dew point at the inlet 22a.

The dry gas flow rate controller 96 may control the flow rate of the dry gas supplied into the casing 23, such that the dew point measured by the outlet dew point meter 82 is lower than the temperature of the cooling tubes 21. However, as described above, the dew point T1 at the inlet 22a is typically higher than the dew point T2 at the outlet 22b. Given the difference α (α=T1−T2), the dry gas flow rate controller 96 needs to control the flow rate of the dry gas, such that T2+α is lower than the temperature of the cooling tubes 21.

The dry gas dew point controller 97 may control the dew point of the dry gas supplied into the casing 23, such that the dew point measured by the inlet dew point meter 81 is lower than the temperature of the cooling tubes 21. As the dew point of the dry gas decreases, the dew point at the inlet 22a decreases. If it is difficult to increase the temperature of the cooling tubes 21, the formation of frost or condensation can be reduced by decreasing the dew point of the dry gas.

The dry gas dew point controller 97 may control the dew point of the dry gas supplied into the casing 23, such that the dew point measured by the outlet dew point meter 82 is lower than the temperature of the cooling tubes 21. However, as described above, the dew point T1 at the inlet 22a is typically higher than the dew point T2 at the outlet 22b. Given the difference α (α=T1−T2), the dry gas dew point controller 97 needs to control the dew point of the dry gas such that T2+α is lower than the temperature of the cooling tubes 21.

Note that the coolant temperature controller 95, the dry gas flow rate controller 96, and the dry gas dew point controller 97 may be used in any combination, or may be separately used. In both cases, the formation of frost or condensation in the fiber paths 22 can be reduced.

[Optical Fiber Manufacturing Method]

Figure 5:
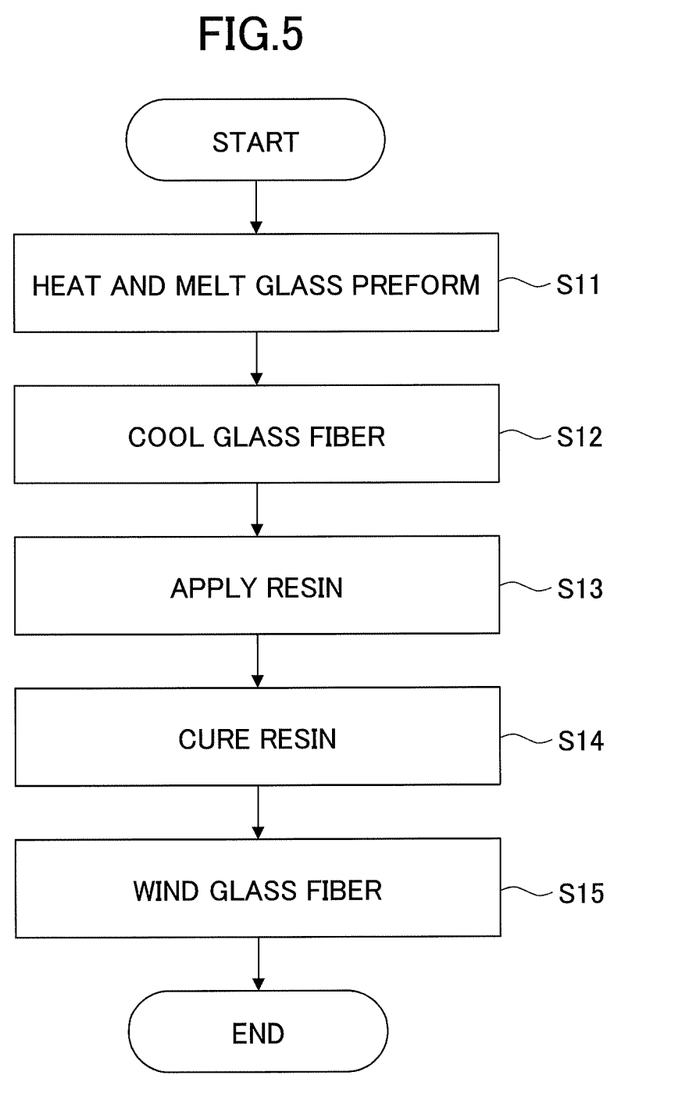
FIG. 5 is a flowchart illustrating an optical fiber manufacturing method according to an embodiment.

FIG. 5 is a flowchart illustrating an optical fiber manufacturing method according to an embodiment. The optical fiber manufacturing method includes a heating and melting process S11, a cooling process S12, a resin applying process S13, a resin curing process S14, and a winding process S15. The above processes are continuously performed, as controlled by the controller 90.

In the heating and melting process S11, a glass preform 2 is heated and melted so as to draw a glass fiber 3 from the glass preform 2. In the drawing furnace 10, the glass fiber 3 is drawn from the glass preform 2.

In the cooling process S12, immediately after the glass fiber 3 is drawn, the glass fiber 3 is cooled before a resin is applied. The temperature of the glass fiber 3 immediately after drawing is high, and thus, a protective resin cannot be applied to the glass fiber 3 as it is. For this reason, immediately after the glass fiber 3 is drawn, the glass fiber 3 is cooled to a temperature near room temperature by the cooling device 20.

In the resin applying process S13, a resin is applied to the cooled glass fiber 3. Examples of the resin include an ultraviolet curing resin. The resin in the form of liquid is stored in the die 61, and the resin is applied to the outer peripheral surface of the glass fiber 3 when the glass fiber 3 passes through the die 61.

In the resin curing process S14, the resin applied to the glass fiber 3 is cured. For example, when an ultraviolet curing resin is applied, the resin applied to the outer peripheral surface of the glass fiber 3 is cured when the glass fiber 3 passes beside the ultraviolet lamp 66. Note that a thermosetting resin may be used instead of the ultraviolet curing resin.

In the winding process S15, the glass fiber 3 coated by the resin is wound on the winding bobbin 4. The winding bobbin 4 is removably held by the winding bobbin holder 71. The winding motor 72 rotates the winding bobbin holder 71, thereby causing the glass fiber 3 to be wound on the winding bobbin 4.

The cooling process S12 includes a process of passing the glass fiber 3 through the fiber paths 22 of the cooling tubes 21 housed in the casing 23. The above process is also referred to as a passing process. The passing process may be performed a plurality of times, as controlled by the controller 90.

The passing process includes supplying the dry gas, having the dew point lower than the temperature of the cooling tubes 21, into the dry space 24 formed between the casing 23 and the cooling tubes 21. Because the dew point of the dry gas is lower than the temperature of the cooling tubes 21, it is possible to reduce the formation of the frost or condensation on the cooling tubes 21 even when the dry gas is cooled.

The passing process includes measuring, by the inlet dew point meter 81, the dew point at an inlet 22a of a fiber path 22. Further, the passing process includes measuring, by the outlet dew point meter 82, the dew point at an outlet 22b of a fiber path 22.

The passing process includes a process of controlling the temperature of the coolant in the cooling tubes 21 such that the temperature of the cooling tubes is higher than the dew point at the inlet 22a of the fiber path 22, based on the dew point measured by the inlet dew point meter 81. Further, the passing process includes a process of controlling the temperature of the coolant in the cooling tubes 21 such that the temperature of the cooling tubes is higher than the dew point at the outlet 22b of the fiber path 22, based on the dew point measured by the outlet dew point meter 82.

The passing process includes a process of controlling the flow rate of the dry gas supplied into the casing 23 such that the dew point at the inlet 22a of the fiber path 22 is lower than the temperature of the cooling tubes 21, based on the dew point measured by the inlet dew point meter 81. Further, the passing process includes controlling the flow rate of the dry gas supplied into the casing 23 such that the dew point at the outlet 22b of the fiber path 22 is lower than the temperature of the cooling tubes 21, based on the dew point measured by the outlet dew point meter 82.

Note that the passing process includes at least one of the process of controlling the temperature of the coolant in the cooling tubes 21, the process of controlling the flow rate of the dry gas, and the process of controlling the dew point of the dry gas. The above controlling processes may be used in any combination, or may be separately used. In both cases, it is possible to reduce the formation of frost or condensation in the fiber paths 22.

Although specific embodiments have been described above, the present disclosure is not limited to the above-described embodiments. Variations, modifications, substitutions, additions, omissions, and combinations can be made to the described subject matter without departing from the scope of the present invention, and it is to be understood that such variations, modifications, substitutions, additions, omissions, and combinations obviously belong in the technical scope of the present invention.

What is claimed is:

1. An optical fiber manufacturing method comprising:
a passing process, passing a glass fiber through a fiber path before applying a resin, the glass fiber being drawn from a glass preform, the fiber path being formed through a cooling tube, and the cooling tube being housed in a casing and being cooled by a coolant; and
applying the resin to the glass fiber after the passing process,
wherein the passing process includes
supplying a dry gas into a dry space formed between the casing and the cooling tube, the dry gas having a first dew point lower than a temperature of the cooling tube,
measuring, by a dew point meter, a second dew point at one or both of an inlet and an outlet of the fiber path, and
controlling a temperature of the coolant in the cooling tube such that the temperature of the cooling tube is higher than the second dew point measured by the dew point meter.

2. An optical fiber manufacturing method comprising[H]:
a passing process, passing a glass fiber through a fiber path before applying a resin, the glass fiber being drawn from a glass preform, the fiber path being formed through a cooling tube, and the cooling tube being housed in a casing and being cooled by a coolant; and
applying the resin to the glass fiber after the passing process,
wherein the passing process includes
supplying a dry gas into a dry space formed between the casing and the cooling tube, the dry gas having a first dew point lower than a temperature of the cooling tube,
measuring, by a dew point meter, a second dew point at one or both of an inlet and an outlet of the fiber path, and
controlling a flow rate of the dry gas such that the second dew point measured by the dew point meter is lower than the temperature of the cooling tube.

3. An optical fiber manufacturing method comprising[H]:
a passing process, passing a glass fiber through a fiber path before applying a resin, the glass fiber being drawn from a glass preform, the fiber path being formed through a cooling tube, and the cooling tube being housed in a casing and being cooled by a coolant; and
applying the resin to the glass fiber after the passing process,
wherein the passing process includes
supplying a dry gas into a dry space formed between the casing and the cooling tube, the dry gas having a first dew point lower than a temperature of the cooling tube,
measuring, by a dew point meter, a second dew point at one or both of an inlet and an outlet of the fiber path, and
controlling the first dew point of the dry gas supplied into the casing, such that the second dew point measured by the dew point meter is lower than the temperature of the cooling tube.

* * * * *